April 11, 1961 H. G. ABBEY 2,979,181

ELECTRICAL POWER CONNECTORS AND BRAKING DEVICES FOR FREE-WHEELED CARRIERS IN CONVEYOR SYSTEMS

Filed Jan. 22, 1959 6 Sheets-Sheet 1

INVENTOR.
HAROLD G. ABBEY

BY

Kenyon & Kenyon
ATTORNEYS

INVENTOR.
HAROLD G. ABBEY
BY
Kenyon & Kenyon
ATTORNEYS

INVENTOR.
HAROLD G. ABBEY
BY
Kenyon & Kenyon
ATTORNEYS

INVENTOR.
HAROLD G. ABBEY
BY
Kenyon & Kenyon
ATTORNEYS

April 11, 1961 H. G. ABBEY 2,979,181

ELECTRICAL POWER CONNECTORS AND BRAKING DEVICES FOR FREE-WHEELED CARRIERS IN CONVEYOR SYSTEMS

Filed Jan. 22, 1959 6 Sheets-Sheet 5

INVENTOR.
HAROLD G. ABBEY

BY

Kenyon & Kenyon

ATTORNEYS

April 11, 1961 H. G. ABBEY 2,979,181

ELECTRICAL POWER CONNECTORS AND BRAKING DEVICES FOR FREE-WHEELED CARRIERS IN CONVEYOR SYSTEMS

Filed Jan. 22, 1959 6 Sheets-Sheet 6

INVENTOR.
HAROLD G. ABBEY
BY
Kenyon & Kenyon
ATTORNEYS

United States Patent Office 2,979,181
Patented Apr. 11, 1961

2,979,181

ELECTRICAL POWER CONNECTORS AND BRAKING DEVICES FOR FREE-WHEELED CARRIERS IN CONVEYOR SYSTEMS

Harold G. Abbey, 189—10 Aberdeen Road, Jamaica 23, N.Y.

Filed Jan. 22, 1959, Ser. No. 788,393
14 Claims. (Cl. 198—19)

The present invention relates generally to process automation conveyor systems, and more particularly to devices for effecting electrical power connections with a free-wheeling work carrier when it enters a work station in the conveyor system and for simultaneously braking the movement of said carrier.

The primary function of all work processing conveyor systems is to position work carriers progressively over different work stations. Thus in electro-plating, anodizing and chemical immersion conveyors, the machine acts to transfer work carriers to different treatment stations or baths and to immerse the work therein in predetermined time cycles.

Characteristic of many conventional conveyor machines for chemical and other processing operations are a common elevating superstructure that lifts all carriers to be transferred in a fixed order, a series of cam-operated arms on common shafts that elevate the carriers in a fixed order and chains that move arms laterally in the up and down position. Since the movements of such mechanisms are dictated by a sequence of relay actions, no movement can occur out of sequence nor can an alteration be made at one station without affecting the others proportionately. Finally the machine, by its nature, is compelled to go through its complete cycles of movements, whether or not work is being processed.

Thus conveyor systems of standard design are inflexible in their operation and entail fixed mechanical movements of structures and invariable synchronization which preclude the flexibility of operations and continuity of work handling demanded by modern automation production techniques.

A major advance in process automation systems is disclosed in the patent to Abbey, entitled "Skip Transfer Conveyors," issued September 30, 1958, No. 2,854,159. This new system, known as the A.P.A. system, makes possible true automation of all modern production requirements and is based on the use of independent, unconnected free-wheeled carriers for racks, barrels, baskets or other work handling devices. The carriers are transferred on an overhead trackway from station to station, the trackway being segmented such that when a carrier enters a station it rests on a track segment which is removable by a separate elevator. The elevator acts to lower the removable segment and the carrier thereon to a work position, the gap in the trackway being closed by a substitute segment which maintains trackway continuity and permits other work carriers to pass over or leap-frog the lowered carrier and to continue toward other work stations.

The load carriers on the trackway are driven by power pushers which are not connected permanently to the carriers, hence the carriers can be switched at will from one power conveyor line to other power conveyor lines or to free gravity trackway lines. Such power and free conveyors have many advantages in manufacturing operations over permanently coupled arrangements, for the carriers need not be unloaded from start to finish of the operation. The operation of the elevators at the various stations are independent of each other and is under the control of the incoming carrier which bears its own instructions.

Heretofore in processing conveyor machines such as those in which the carrier supports a rotatable barrel or a plating rack, electrical power contacts cannot be made with the carrier until the carrier has been lowered to its work position in which by the use of saddle contacts on the tank or similar means, the necessary power connections are made.

The primary object of the present invention is to provide means for effecting electrical power connection between a power source and the carrier when the carrier enters a removable segment in the trackway of an A.P.A. system.

Also an object of the invention is to provide electrical contact means of the above type which act also frictionally to brake the inertial or gravity carrier movement or to prevent further movement thereof, thus eliminating the need for mechanical stop devices and other braking elements.

Still another object of the invention is to provide a contact device of the above type which permits rotation of the barrels, mechanical agitation or other powered operations while the carriers are being lowered or raised relative to a work station, such as a tank, as well as when the work is actually immersed.

A significant feature of the invention is that when applied to carrier-borne plating barrels driven by a motor, the motor obtains its power upon entrance of the carrier at the station, this being accomplished by engagement with single or three-phase contact bars and special pick-ups on the carrier. Thus the barrel can be caused to start rotating on its way into solution for higher currents without welding of parts and also while coming out of solution to minimize solution drag-out losses. This arrangement also makes possible rotation of the barrel through a dryer.

For any other motivated devices that need be carried on the work carrier the same method of electrification is applied, thereby eleminating any trailing tables and continuously engaged wires or trolleys. The carrier in the present invention remains self-contained and free-wheeled as usual and only engages power contacts upon entering a work station or section.

As applied to rack-plating techniques, the present invention makes possible the application to the carrier of the heavy direct current utilized in most electroplating and anodizing processes. The carrier supports an inverted spring-type shoe which in conveying is uncontacted and free of any friction, such that the carrier ordinarily remains unimpeded. But when entering a station where electrification is required or on any stretch of the conveyor run where electrification is entailed, the contact shoe, which acts also as a brake, engages a copper bus bar underneath the main track to make a positive contact. This positive contact allows for live entry into the plating solution if desired, and also permits unbroken contact when vertical agitation of the work is required.

Inasmuch as the stations are provided with individual elevators, by a proper time switch arrangement, the elevators may be operated to go through successive up and down motions at a given rate to agitate the work carried thereby in the solution, while power is continuously applied.

For a better understanding of the invention as well as other objects and further features thereof, reference is made to the following detailed description to be read in conjunction with the accompanying drawings, wherein like components are identified by like reference numerals.

In the drawings:

Fig. 8 is a longitudinal section of the carrier truck shown in Fig. 7, the view being taken in the plane indicated by line 8—8 in Fig. 7.

Figure 1:
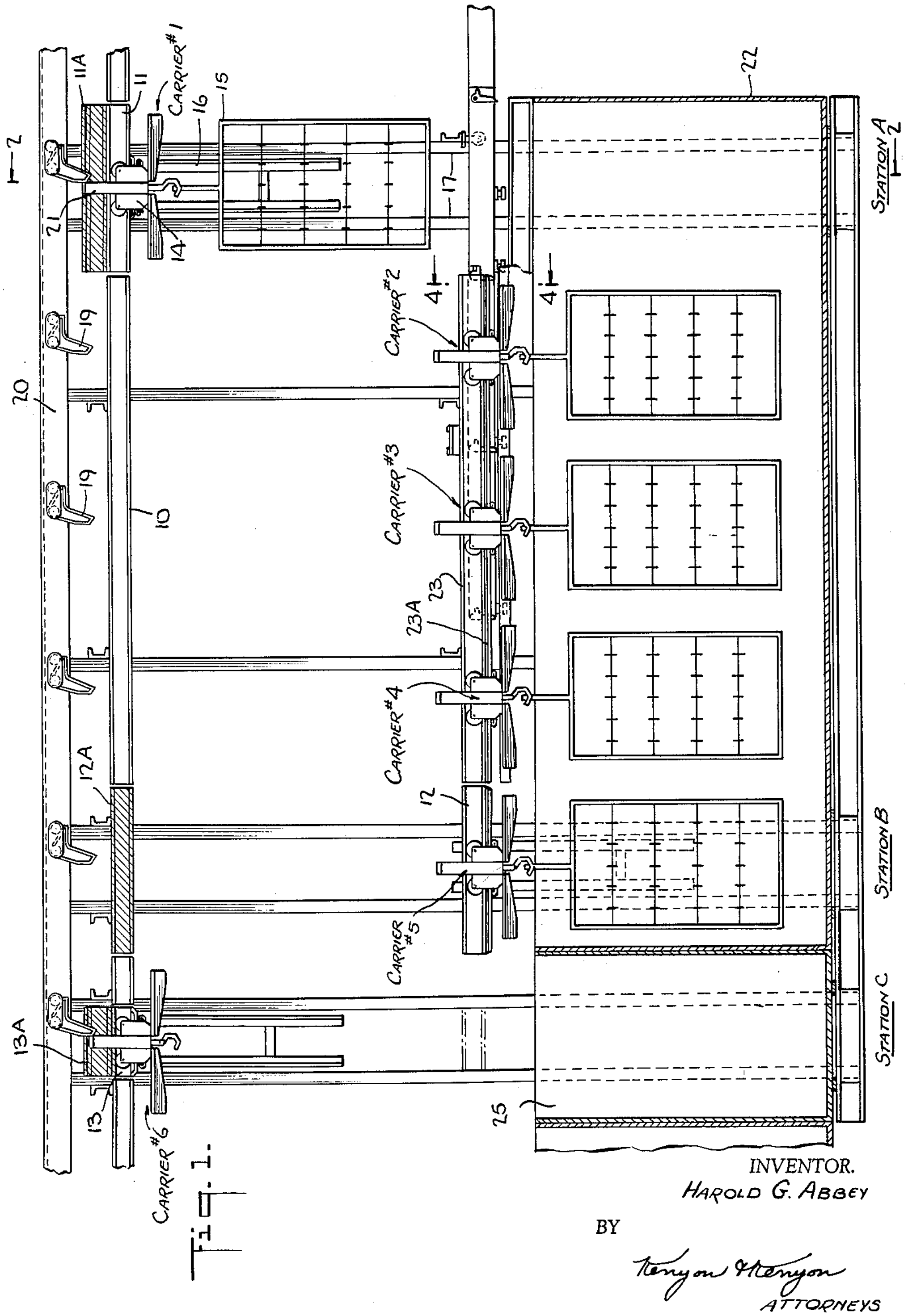
Fig. 1 is a front elevational view, partly in section, of an automatic plating machine of the rack type which is electrified in accordance with the invention.

Referring now to Figs. 1 to 4, there is shown a process conveying system of the A.P.A. type comprising a horizontally extending trackway, generally designated by numeral 10, and including transfer segments 11, 12 and 13 which normally are in linear registration with the trackway but are removable therefrom. Segment 12 is shown displaced from its trackway position.

Movable along the trackway are work carriers #1 to #6, each including a trolley or truck 14 rideable along the trackway from which is suspended a pair of plating racks 15. The removable segments 11, 12 and 13 are operative to raise and lower the work carriers at elevated stations A, B and C. Directly above each removable segment there is disposed a related substitute segment 11A, 12A and 13A, shown by shading, which automatically drops into place when the removable segment is lowered, thereby filling the gap and providing a freeway over which other carrier trucks can leapfrog. This condition is indicated by substitute segment 12A which occupies the position vacated by removable segment 12.

Figs. 1 to 4 show only a small section of the overall conveyor and processing system. In practice the complete system may take the form of a continuous trackway having a large number of stations for carrying out varied operations such as chemical cleaning, plating, rinsing, drying, etc. The arrangement is such that any of the work carriers may be made to undergo any desired sequence of operations independently of the operating cycles of the other carriers in the system. Some of the many possible system arrangements are disclosed in the above-identified Abbey patent, in the A.P.A. bulletin 101 published by Abbey Process Automation, Inc., Long Island City, New York, and in the magazine "Design News" for June 9, 1958, and "Automation" for December 1958.

Each of the transfer segments 11, 12 and 13 is movable downwardly from the trackway by an individual elevator which may take the form of a carriage 16 riding on a pair of spaced vertical rails 17, the segment being borne by the carriage by a connecting bracket 18. Movement of the carriage on the rails may be effected by suitable hydraulic or electric mechanisms, thereby lowering or raising the carrier as required.

The trucks 14 of the several work carriers are indexed or shifted in a stepwise manner along the trackway from right to left on Fig. 1 by means of pusher fingers or dogs 19 which are pivotally connected to a reciprocally-actuated bar 20 disposed over the trackway 10 and parallel thereto. Projecting outwardly from each trolley 14 and extending upwardly therefrom is a bracket 21 which is engaged in the forward direction by dog 19 to push the trolley.

Bar 20 is driven by a hydraulic piston or other means in alternate directions and at timed intervals such that in the forward stroke the dogs 19 engage and push the trolleys one full step and in the reverse stroke the dogs flip over the trolley brackets while the trolleys remain stationary. Since the pusher dogs are not mechanically connected to the trolleys, the trolleys are freewheeling.

Figs. 1 to 4 illustrate how the arrangement combines "cell" and "drag-through" processing in a single system, the operational flow being to the left on the overhead trackway. The carriers #1 to #6 are seen in up and down positions at different stations. Each carrier functions independently as a robot and selects its cycles automatically as scheduled. The manner in which this is accomplished is disclosed more fully in the copending Abbey application Ser. No. 694,626, filed November 5, 1957, and forms no part of the present invention.

Carrier #1 over station A is in "up" position, with its freewheeled truck on the removable segment 11. From here it can travel along the trackway, bypassing and leapfrogging carriers in process underneath or it can descend with its track segment 11 by means of the elevator at station A into the processing tank 22 which lies between station A and station B. Work is brought into the tank 22 at station A and removed at station B.

If carrier #1 is scheduled for station A, it lowers here into processing tank 22, causing the substitute segment 11A to drop in automatically. In this manner carrier #1 enters the "drag-through" process between stations A and B, joining carriers #2, #3, #4 and #5 in "down" position already in process. The movement of the carriers in the tank 22 is effected by a lower trackway 23 to which the carriers are transferred by the elevator at station A. When segment 11 is in its lowermost position it is in horizontal registration with trackway 23. Movement of the carriers along trackway 23 is effected by reciprocating dogs 24.

As these carriers "drag-through" in sequence on the lower trackway, the first one scheduled to leave the process is carrier #5 which is in "down" position on the main track segment 12 in station B. As the station B elevator raises the track segment 12 to the main overhead trackway, the substitute segment 12A is pushed out of the trackway into storage directly above. Carrier #5 then proceeds to its next scheduled designation.

Carrier #6 is in "up" position on the main track segment 13 at station C and can travel along the trackway, bypassing station C or descending with the track segment 13 by the elevator at station C into the next processing tank 25. When carrier #6 enters the tank 25 the interchangeable track segment maneuver is repeated and all other carriers bypass the occupied station, as they elect, by traveling on the substitute track segment 13A.

Figure 6:
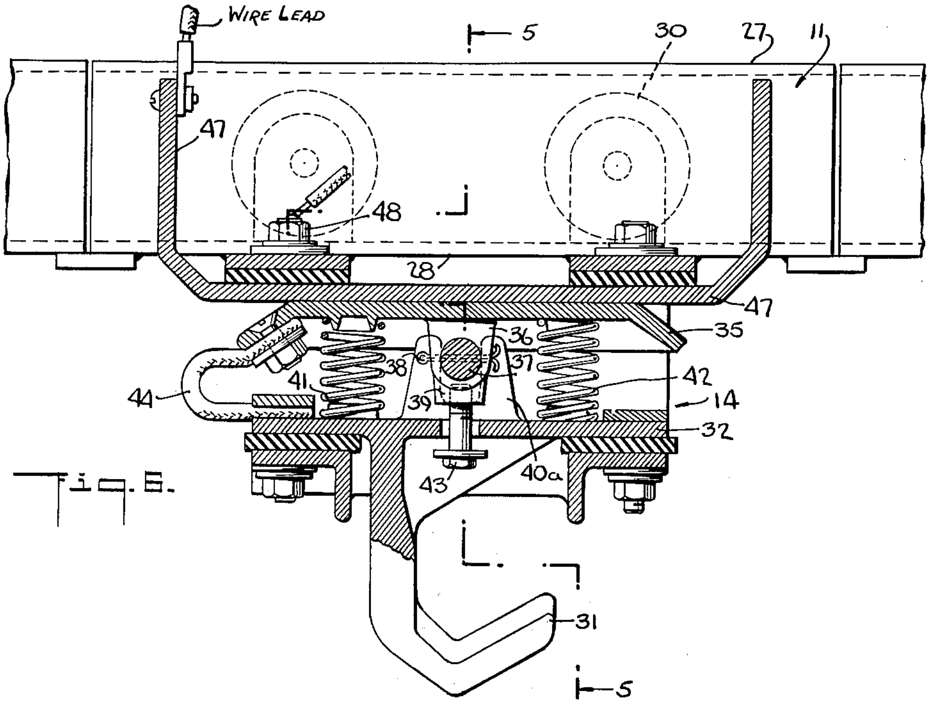
Fig. 6 is a longitudinal section of the carrier truck and removable segment shown in Fig. 5, the section being taken in the plane indicated by line 6—6 in Fig. 5.
Figure 5:
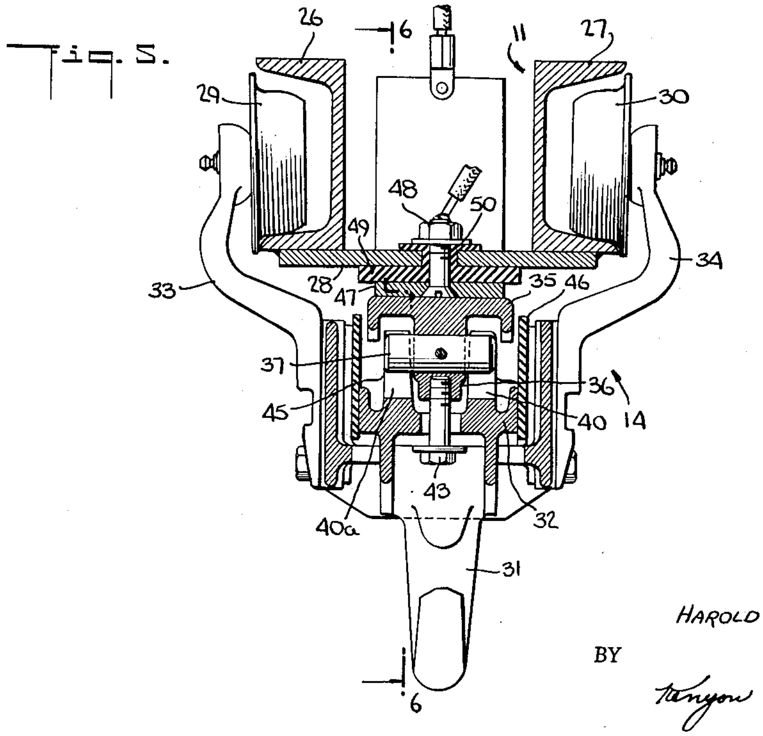
Fig. 5 is a transverse section taken through a carrier truck and a removable segment of the plating machine trackway, arranged for single pole electric operation.
Figure 6:
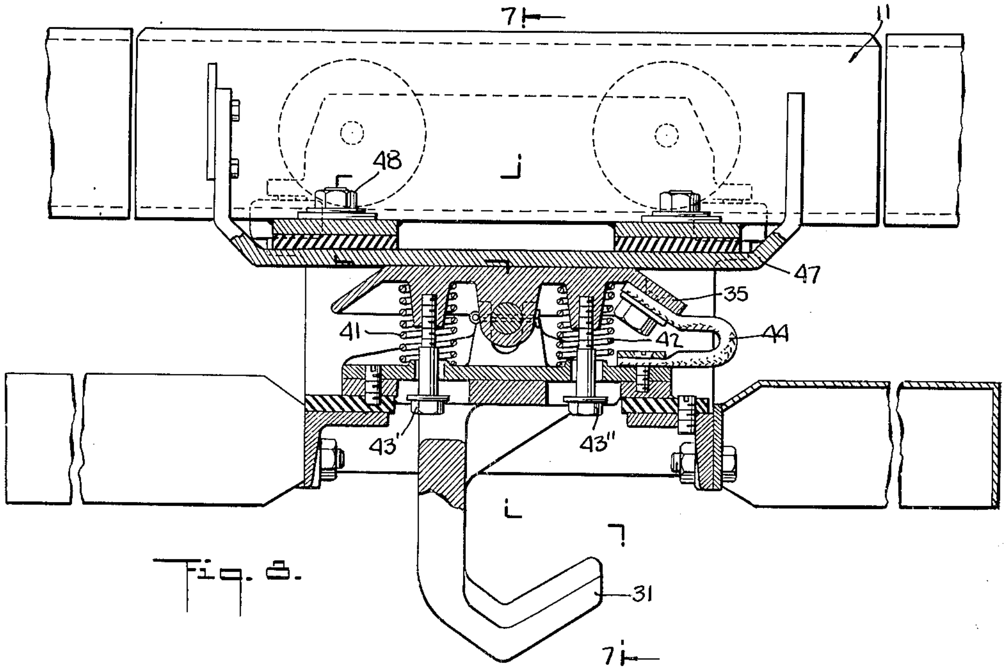

Referring now to Figs. 5 and 6, there is shown an electrified truck 14 in accordance with the invention which makes contact with a power source upon entering a trackway segment, such as segment 11 in Fig. 1. The trackway and the segments forming a part thereof is constituted by a pair of channel members 26 and 27 which are rigidly supported in parallel relation by a spacer plate 28. Thus the trackway is relatively wide as compared to a conventional I beam to provide stable carrier operation.

The truck 14 includes two sets of wheels 29 and 30 which ride freely within the channel members 26 and 27. The racks are suspended from the truck by means of a metal work hook 31 which is dependent from and integral with a base plate 32. Base plate 32 is fixedly mounted between the upwardly-extending arms 33 and 34 which carry the wheels 29 and 30.

Resiliently supported above base plate 32 between arms 33 and 34 is an electrical sliding contact shoe 35. Projecting below shoe 35 at the longitudinal center thereof is a lug member 36 having a transverse bore through which is extended a rod 37, the rod 37 being connected to the lug by a cotter pin 38. The opposing ends of the rod 37 are received within the U-shaped recesses 39 of a pair of saddle pieces 40 and 40*a* integral with the base plate 32.

Helical springs 41 and 42 are interposed between the underside of the shoe 35 and the base plate 32 which urge the shoe upwardly, the extent of upward movement being restricted by a bolt 43 connected to the lug 36 and extending through an opening in the base plate 32, the head of the bolt engaging the under surface of base plate 32 to limit the upward movement of the shoe.

The shoe 35 and the base plate 32 as well as the work hook 31 are all made of highly conductive metal such as bronze or copper. A flexible wire conductor 44 is connected between shoe 35 and base plate 32 to ensure effective connection therebetween. The base plate and the shoe electrically connected thereto are electrically isolated from the track arms 33 and 34 by insulating plates 45 and 46.

When the truck enters a station, the sliding shoe 35 frictionally engages a bus bar 47 mounted by screws 48 below the spacer plate 28 on the track segment, the bar 47 being insulated from the trackway by an insulating strip 49. The screws 48 are insulated from the spacer plate 28 by suitable grommets 50. The limit bolt 43 is so adjusted as to restrain the shoe from any contact with the trackway in the absence of a bus bar. The upward tension on the shoe is so adjusted as to afford sufficient frictional braking to arrest the movement of the carrier at the segment.

Figure 2:
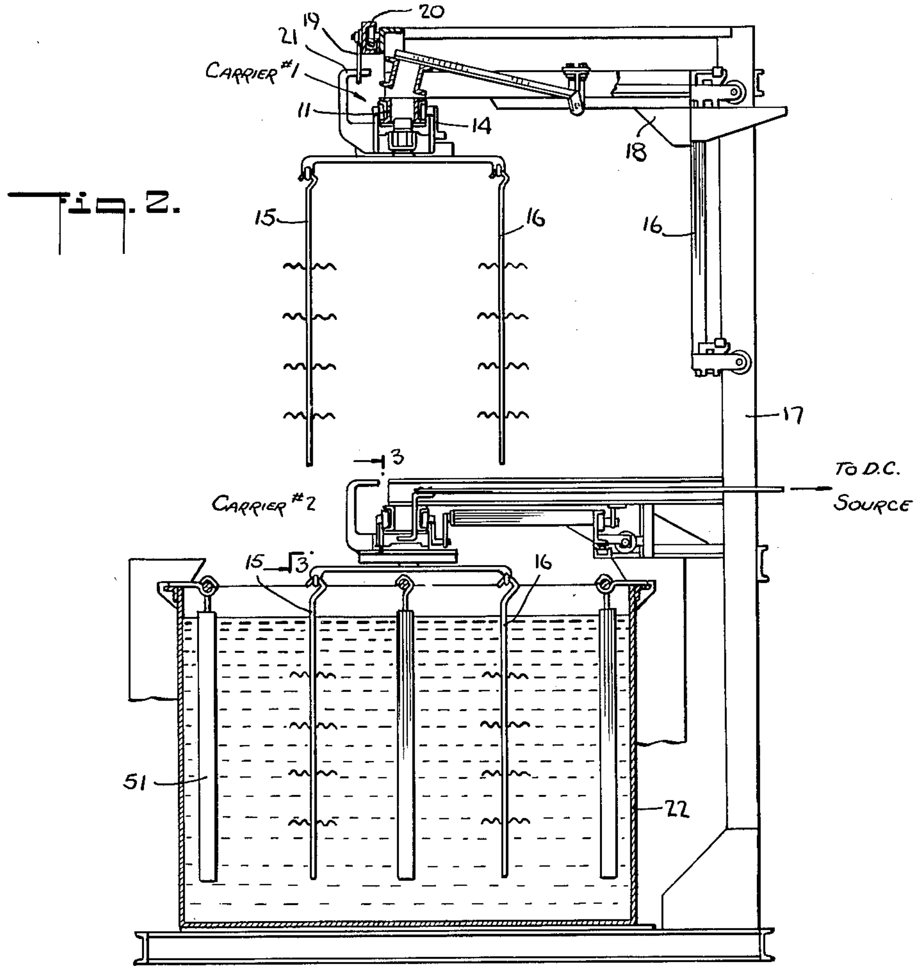
Fig. 2 is a transverse sectional view of the machine taken in the plane indicated by line 2—2 in Fig. 1.
Figure 4:
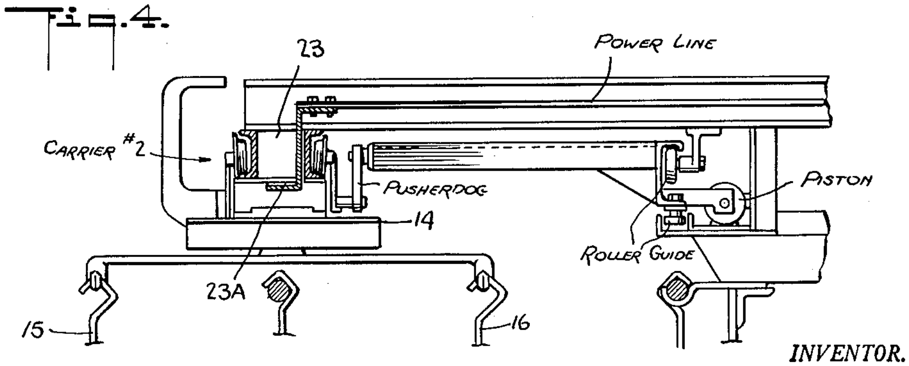
Fig. 4 is a sectional view of another detail of the machine taken in the plane indicated by line 4—4 in Fig. 1.

By connecting a power lead to the screws 48, or to bus bar 47, the carrier is electrified when it enters the station, rather than when it is lowered into the tank. Thus assuming direct current rack plating, as in Figs. 1 to 4, one pole of the D.-C. source may be applied to the bus bars and the other pole to the electrodes 51 resting in the tank 22 (Fig. 2).

In Fig. 1 bus bar pieces are provided for each of the removable segments on the upper trackway 10, whereas a continuous bus bar 23A is provided for the full length of the lower trackway 23 (note Fig. 4) whereby current is caused to flow throughout the entire tank drag movement. It is to be understood that in lieu of hooks, the truck may be provided with a basket or a barrel or any other work-holding means to which a voltage is to be applied.

The arrangement shown in Figs. 5 and 6 is a single pole electrified carrier in which the sliding contact shoe combines the function of friction brake and shoe. There are many instances where double pole connections are necessary. A suitable arrangement for this purpose is shown in Figs. 7 and 8.

Figure 7:
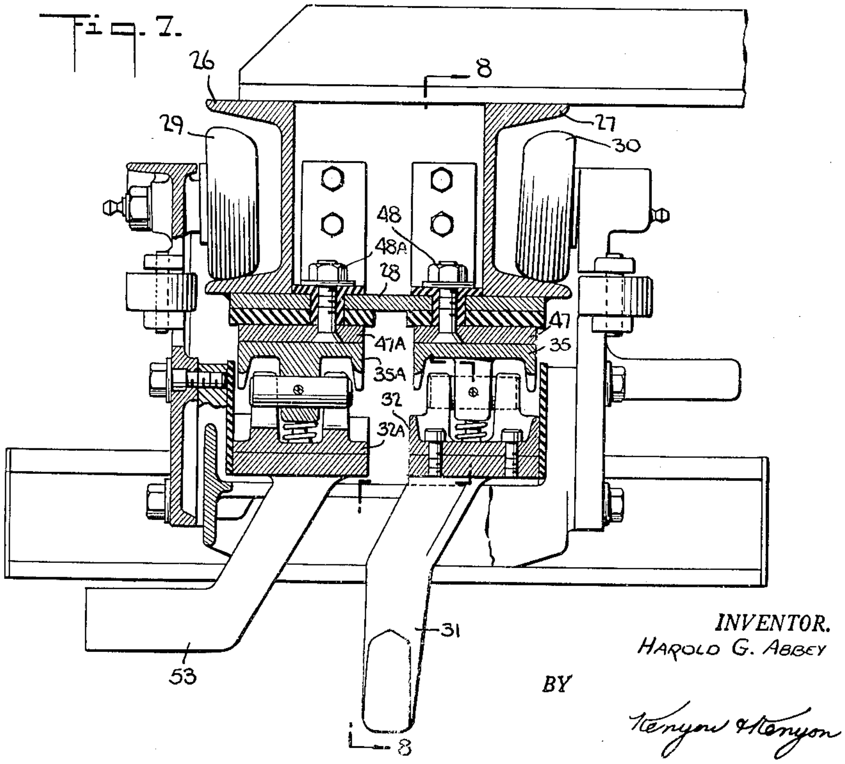
Fig. 7 is a transverse section taken through a carrier truck and trackway segment adapted for double pole operation.

Essentially the arrangement in Figs. 7 and 8 involves duplicating of the components shown in Figs. 5 and 6, to provide a mating pair of contact shoes acting in conjunction with a pair of bus bars. For this reason one of the shoes and its associated components are designated by the same reference numeral as in Figs. 5 and 6, while the mating shoe and its associated components bear the same numbers followed by letter A. A hook is connected to one of the base plates and an auxiliary or second pole 53 is connected to the other base plate. One input lead is connected to the bus bar screw 48 and the other to the bus bar screw 48A. Also, as shown in Fig. 8, the shoe movement is limited by a pair of bolts 43′ and 43″ which go through the springs 41 and 44 instead of a single bolt as in Fig. 6.

It is to be understood that the voltage may be applied immediately when the shoe engages the bus bar or at some later point when the carrier is lowered to a work station. For example, a flexible lead may be connected between the voltage source and the bus bar on the trackway segment, in which event the voltage is immediately effective when the bus bar is engaged. On the other hand, the bus bar on the segment may be connected with a sliding contact supported from the elevator carriage adapted to engage a fixed contact leading to the voltage source only when the elevator carriage is so positioned that the work is immersed. Obviously other arrangements may be used to make the voltage effective at a given elevational point in the operation of the work carrier.

Figure 9:
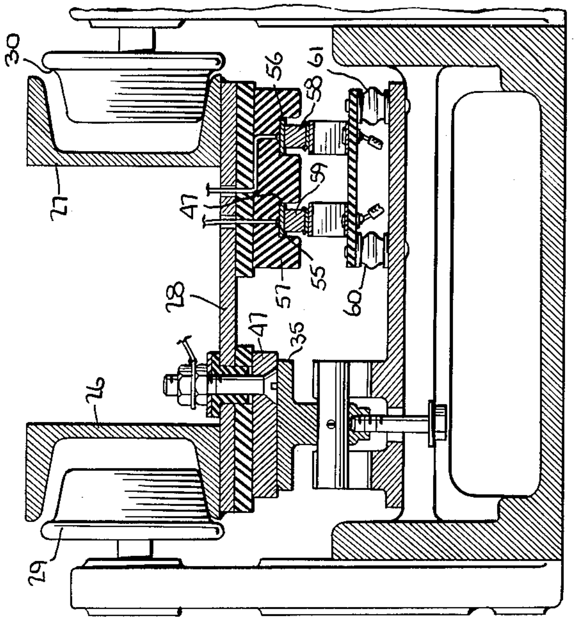
Fig. 9 is a transverse section taken through still another preferred embodiment of a carrier truck adapted for both D.-C. and A.-C. electrification.

Referring now to Fig. 9, there is shown a trolley arrangement electrified for both D.-C. and A.-C. operation. The D.-C. electrification is obtained with a brake-sliding contact shoe as shown more fully in Figs. 5 and 6 and including a brake shoe 35 and a bus bar 47. A.-C. electrification is effected by a pair of bus bars 55 and 56 inserted within grooves formed in a molded insulation strip 57 mounted below the spacer plate 28 which supports the track channels. Contact is made with bus bars 55 and 56 by means of carbon brushes 58 and 59 spring-mounted above standoff insulators 60 and 61. Thus braking as well as D.-C. connections are effected at the left side of the trolley, whereby A.-C. connections are completed at the right side.

Figure 10:
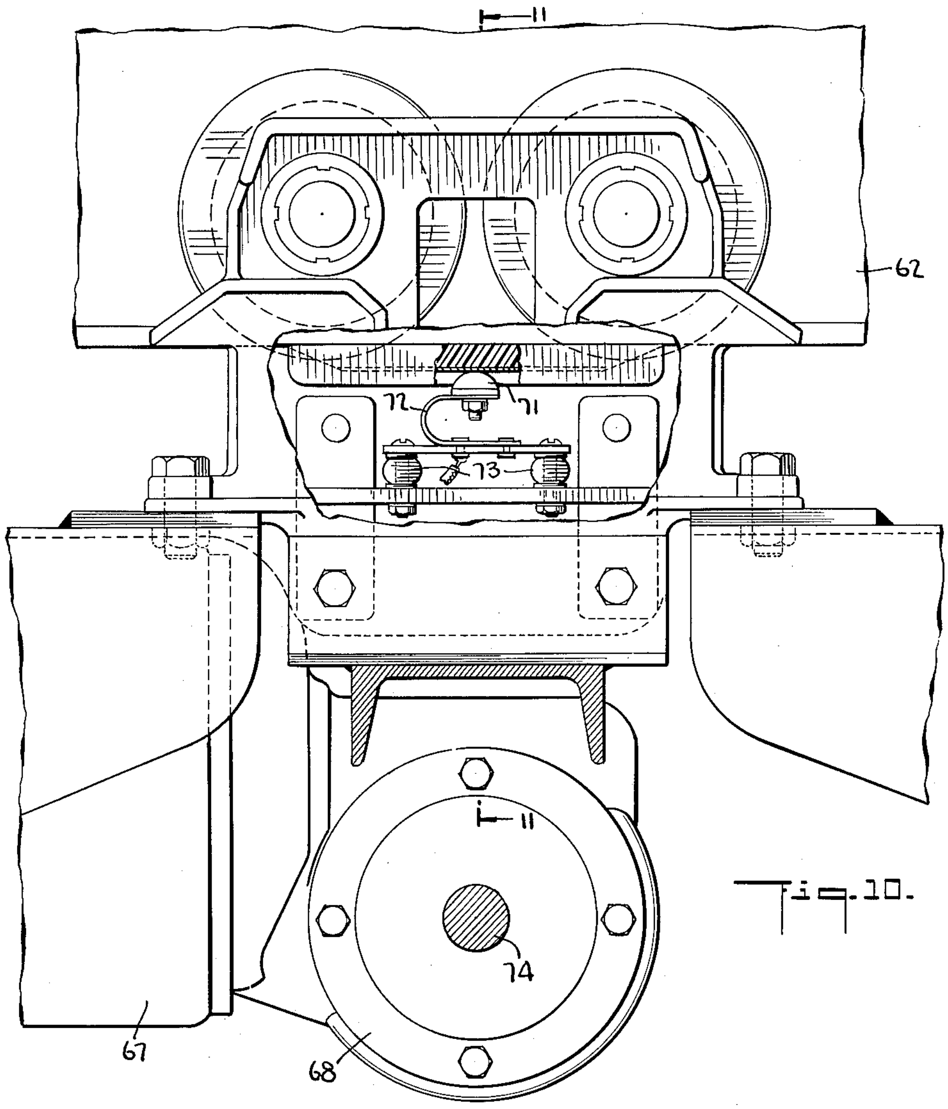
Fig. 10 is a transverse section taken through an electrified trolley assembly for a motorized barrel.
Figure 3:
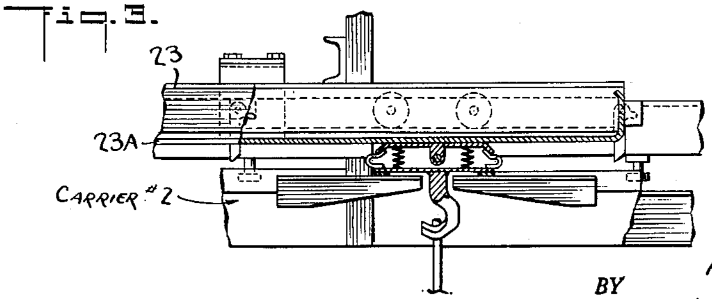
Fig. 3 is a front elevational view of a detail of the machine as seen in the direction indicated by arrows 3—3 in Fig. 2.
Figure 11:
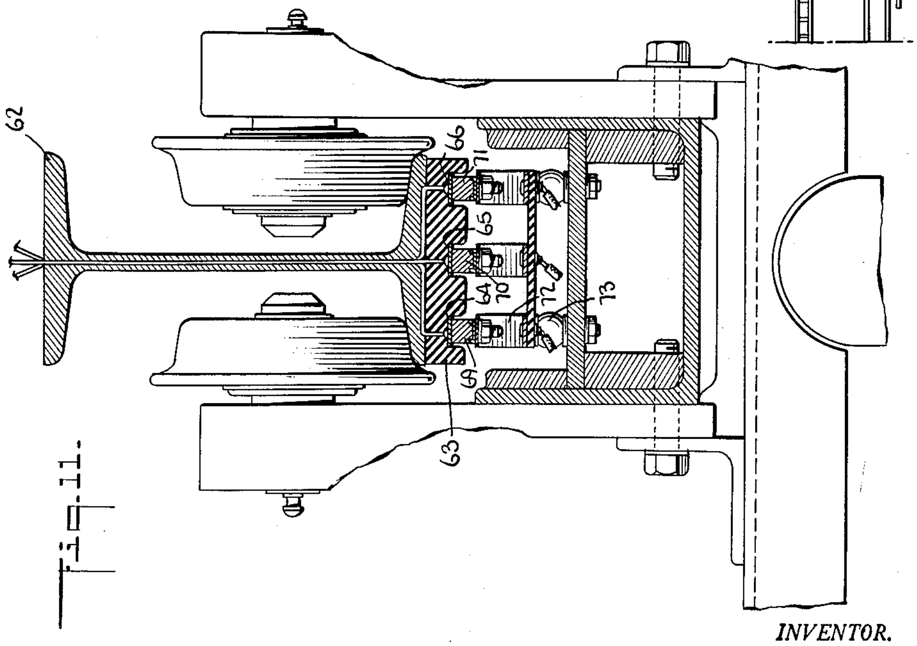
Fig. 11 is a section of the trolley assembly taken in the plane indicated by line 11—11 in Fig. 10.

Referring now to Figs. 10 and 11, there is shown an electrification arrangement for a trolley assembly which supports a motorized barrel. In this case the track is a conventional I beam having at least one removable segment 62. It is to be understood that other forms of tracking may be employed for the same purpose. Mounted below the lower flange of track segment 62 is a molded bus holder 63 having three parallel grooves formed therein to accommodate the bus bars 64, 65 and 66. Suspended below the trolley is a barrel whose drive shaft 74 is driven by a motor 67 though a gear reduction device 68. The motor is of the three-phase type, power connections thereto being made by carbon brushes 69, 70 and 71, each of which is mounted on spring 72, as best seen in Fig. 10, the brushes and the springs thereof being supported on standoff insulators 73. Leads for the three bus bars are conveyed through suitable bores in the shank of the I beam trackway segment, while other leads connect the brushes engaging the bus bars to the motor.

Thus the motor is energized and begins to turn when the carrier enters the station rather than when the carrier is brought down to the processing cell. The motor not only may be run before the work is immersed but also after such immersion. Moreover, the elevator may be caused to oscillate up and down by a suitable timing and reversing means, thereby causing vertical agitation of the work as the motor continues to turn.

Figure 12:
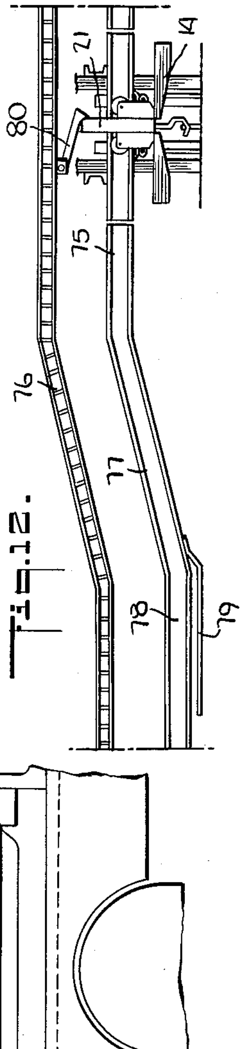
Fig. 12 shows a "down" grade conveyor section including braking means.

Referring now to Fig. 12, there is shown an arrangement for conveying a carrier 14 which may be constructed in a manner similar to carrier 14 in Fig. 6 and including a contact shoe, the carrier being advanced along a trackway 75 by means of a continuously moving power chain 76. Trackway 75 includes a gravity "down" grade section 75, the "down" grade section feeding into a "rest" track section 78 below which is mounted a flat friction plate 79, preferably of steel, adapted to engage the carrier shoe on the carrier.

Attached to the chain 76 is a pusher dog 80 which is spring loaded so that any firm stopping of the carrier allows the continuously moving dog to jump out and leave the carrier. Thus the pusher dog propels the carrier 14 and causes it to run down the track section 75 into the track section 78 where the contact shoe engages the friction plate 79 to prevent gravity acceleration of the carrier. This type of chain propulsion may be used to convey carriers to different locations where they may accumulate or be lowered by individual A.P.A. elevators. The trackway may include "up" and "down" grades, the placing of a friction plate at the "down" grade engaging the carrier shoes and effectively absorbing the gravity acceleration to prevent bumping and collision.

While there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a conveyor system provided with work carriers and a trackway for conveying said carriers to various work stations disposed below said track, said trackway including removable rail segments vertically disposed above said stations and means operatively coupled to said segments to lower same to a work station therebelow, apparatus for electrifying said carrier when it enters a removable segment in said trackway comprising a first contact member attached below said segment and insulated therefrom, a second contact member borne by said carrier and engageable with said first contact member when said carrier enters said segment, and means to apply a power supply voltage to said removable segment at all positions thereof whereby said carrier is electrified both at the trackway position and at the work station position.

2. A conveyor system provided with a plurality of work carriers, a track for conveying said carriers to various work stations disposed below said track and including removable rail segments vertically disposed above said stations and elevator means operatively coupled to said segments to lower same to a work station therebelow, and apparatus for electrifying said carrier when it enters a removable segment in said trackway, said apparatus comprising a first contact member secured to said segment and insulated therefrom, a second contact member borne by said carrier and engageable with said first contact member when said carrier enters said segment, said contact engagement being maintained when said segment is shifted by said elevator means, and means to apply a power supply voltage to said removable segment at all positions thereof whereby said carrier is electrified both at the trackway position and at the work station position.

3. A conveyor system provided with a plurality of work carriers, a track for conveying said carriers to various work stations disposed below said track and including removable rail segments vertically disposed above said stations and elevator means operatively coupled to said segments to lower same to a work station therebelow, and apparatus for electrifying said carrier when it enters a removable segment in said trackway, said apparatus comprising a first contact member secured to said segment and insulated therefrom, and a second contact member borne by said carrier and engageable with said first contact member when said carrier enters said segment, said contact engagement being maintained when said segment is shifted by said elevator means, means to apply a power supply voltage to said removable segment at selected positions thereof below said trackway, and means to effect reciprocable operation of said elevator means to cause vertical agitation of said work carriers while electrified.

4. A conveyor system provided with a plurality of work carriers, a track for conveying said carriers to various work stations disposed below said track and including removable rail segments vertically disposed above said stations and elevator means operatively coupled to said segments to lower same to a work station therebelow, and apparatus for electrifying said carrier when it enters a removable segment in said trackway, said apparatus comprising a first contact member fixedly mounted under said segment insulated therefrom, and a second contact member resiliently borne by said carrier and frictionally engageable with said first contact member when said carrier enters said segment to brake the movement of said carrier, said contact engagement being maintained when said segment is shifted by said elevator means, and means to apply a power supply voltage to said removable segment at all positions thereof whereby said carrier is electrified both at the trackway position and at the work station position.

5. In a conveyer system provided with a work carrier which is conveyed along a trackway, means to brake said carrier when it reaches a given position on said trackway and to electrify same at said position, said means comprising a bus bar mounted on said trackway at said position and a sliding shoe contact supported on said carrier and arranged frictionally to engage said bus bar and to make electrical contact therewith.

6. In a conveyer system provided with a work carrier which is wheeled along an overhead trackway and suspended therefrom, means to brake said carrier when it reaches a given position on said trackway and to electrify same at said position, said means comprising a bus bar mounted below said trackway at said position, a sliding shoe contact supported on said carrier and arranged frictionally to engage said bus bar and to make electrical contact therewith and means urging said shoe contact upwardly to a limited extent whereby the shoe can reach only said bus bar.

7. In a conveyer system, a trackway constituted by a pair of channel members maintained in parallel relation by a spacer plate, said trackway including removable segments, a work carrier having trolley rollers riding on said channels and adapted to suspend work below said trackway, and means to electrify said work when said carrier reaches any one of said segments said means including an electrical bus bar mounted under said spacer plate and insulated therefrom, and a sliding contact shoe mounted on said carrier between said rollers and frictionally engageable with said bus bar to effect an electrical connection therewith and at the same time to brake said carrier.

8. In a conveyer system, an overhead trackway including removable segments, a work carrier riding on said trackway and adapted to suspend work therebelow for passage to work stations, and apparatus for electrifying said carrier including a bus bar mounted under each said segment and insulated therefrom, and a sliding contact shoe resiliently mounted on said carrier frictionally to engage said bus bar and to brake said carrier, said work carrier supporting electroplating racks electrically connected to said contact shoe.

9. In a conveyer system, a trackway including removable segments, a work carrier provided with a trolley having rollers riding on said trackway and adapted to suspend work below said trackway for passage to work stations, and multiple-pole apparatus for electrifying said carrier including a plurality of spaced bus bars mounted under each of said segments and insulated therefrom, and a like plurality of brushes resiliently mounted on said carrier to engage said bus bars when said carrier enters a removable segment.

10. In a conveyer system, a trackway constituted by a pair of channel members maintained in parallel relation by a spacer plate, said trackway including removable segments, a work carrier having trolley rollers riding on said channels and adapted to suspend work below said trackway, an elevator for removing each of said segments from said trackway, and means to electrify said work when said carrier reaches any one of said segments, said means including an electrical bus bar mounted below said spacer plate and insulated therefrom, a sliding contact shoe resiliently mounted on said carrier between said rollers and frictionally engageable with said bus bar to effect an electrical connection and at the same time to brake said carrier, and electrical leads extending between said channel member on each of said segments and connected to the related bus bar.

11. A conveyer system comprising a trackway, at least one carrier movable along said trackway and including a contact shoe which normally is maintained out of engagement with said trackway, and a friction plate mounted on said trackway and engageable with said shoe to prevent acceleration of said carrier.

12. In a conveyer system as set forth in claim 11 wherein said friction plate constitutes an insulated electrical contact to electrify said carrier through said shoe.

13. In a conveyer system as set forth in claim 11 further including continuously moving power chain means to propel said carrier, said chain means being provided with a spring biased pusher dog engaging said carrier to advance same, said dog jumping over said carrier when said carrier is firmly arrested.

14. A conveyer system comprising a trackway having a high section and low section and an inclined "down" grade section joining the high and low sections, at least one carrier movable along said trackway and provided with a contact shoe which is maintained out of engagement with said trackway, and a friction plate on said low section to engage said shoe and prevent gravity acceleration of said carrier when riding down said inclined section.

References Cited in the file of this patent

UNITED STATES PATENTS

| | | |
|---|---|---|
| 2,256,560 | Hannon | Sept. 23, 1941 |
| 2,854,159 | Abbey | Sept. 30, 1958 |
| 2,894,460 | Klamp | July 14, 1959 |